(12) United States Patent
Gudeman

(10) Patent No.: US 10,291,332 B2
(45) Date of Patent: May 14, 2019

(54) SELF-ALIGNED SILICON FIBER OPTIC CONNECTOR

(71) Applicant: Innovative Micro Technology, Goleta, CA (US)

(72) Inventor: Christopher S. Gudeman, Lompoc, CA (US)

(73) Assignee: Innovatice Micro Technology, Goleta, CA (US)

( * ) Notice: Subject to any disclaimer, the term of this patent is extended or adjusted under 35 U.S.C. 154(b) by 0 days.

(21) Appl. No.: 15/934,450

(22) Filed: Mar. 23, 2018

(65) Prior Publication Data

US 2018/0294891 A1    Oct. 11, 2018

Related U.S. Application Data

(60) Provisional application No. 62/484,366, filed on Apr. 11, 2017.

(51) Int. Cl.
| | |
|---|---|
| *H04B 10/00* | (2013.01) |
| *H04B 10/80* | (2013.01) |
| *H04B 10/40* | (2013.01) |
| *G02B 6/12* | (2006.01) |
| *G02B 6/32* | (2006.01) |
| *G02B 6/42* | (2006.01) |

(52) U.S. Cl.
CPC ....... *H04B 10/801* (2013.01); *G02B 6/12019* (2013.01); *G02B 6/32* (2013.01); *G02B 6/322* (2013.01); *G02B 6/4292* (2013.01); *H04B 10/40* (2013.01)

(58) Field of Classification Search
USPC .................................................. 385/59, 137
See application file for complete search history.

(56) References Cited

U.S. PATENT DOCUMENTS

| | | | | | |
|---|---|---|---|---|---|
| 4,119,362 | A | * | 10/1978 | Holzman ................. | G02B 6/32 385/73 |
| 4,265,511 | A | * | 5/1981 | Nicia ....................... | G02B 6/32 385/33 |
| 4,304,461 | A | * | 12/1981 | Stewart ................... | G02B 6/32 385/74 |
| 4,371,233 | A | * | 2/1983 | Masuda .................. | G02B 6/327 385/74 |
| 4,451,115 | A | * | 5/1984 | Nicia ..................... | G02B 6/3843 385/74 |
| 4,497,536 | A | * | 2/1985 | Payne .................. | G02B 6/2552 385/61 |
| 4,632,505 | A | * | 12/1986 | Allsworth ................ | G02B 6/32 385/61 |
| 4,753,508 | A | * | 6/1988 | Meuleman ............... | G02B 6/32 250/227.24 |
| 4,781,431 | A | * | 11/1988 | Wesson .................... | G02B 6/32 385/61 |

(Continued)

*Primary Examiner* — Agustin Bello
(74) *Attorney, Agent, or Firm* — Jaquelin K. Spong

(57) ABSTRACT

A transceiver and interconnect for connecting a plurality of optical cables. In one embodiment, optical sources are joined to a plurality of fiber optic output cables. The structures may use a plurality of ball lenses to collimate the diverging light from the source and launch it down one of the plurality of fibers. Through holes in a silicon substrate may allow the radiation to pass, and these features may be made very precisely.

31 Claims, 9 Drawing Sheets

(56) References Cited

U.S. PATENT DOCUMENTS

| | | | | |
|---|---|---|---|---|
| 4,799,759 A | * | 1/1989 | Balyasny | G02B 6/32 385/66 |
| 4,807,958 A | * | 2/1989 | Gunner | G02B 6/32 385/74 |
| 4,826,272 A | * | 5/1989 | Pimpinella | G02B 6/4202 257/432 |
| 5,022,733 A | * | 6/1991 | Angenent | G02B 6/327 385/35 |
| 5,123,073 A | * | 6/1992 | Pimpinella | G02B 6/32 385/59 |
| 5,181,216 A | * | 1/1993 | Ackerman | G02B 6/4204 257/432 |
| 5,185,836 A | * | 2/1993 | Baker | G02B 6/2552 385/33 |
| 5,210,815 A | * | 5/1993 | Alexander | G02B 6/262 385/138 |
| 5,247,595 A | * | 9/1993 | Foldi | G02B 6/32 385/35 |
| 5,257,332 A | * | 10/1993 | Pimpinella | G02B 6/32 385/33 |
| 5,259,054 A | * | 11/1993 | Benzoni | G02B 6/4202 385/76 |
| 5,293,438 A | * | 3/1994 | Konno | G02B 6/2552 385/35 |
| 5,357,590 A | * | 10/1994 | Auracher | G02B 6/30 385/129 |
| 5,440,655 A | * | 8/1995 | Kaplow | G02B 6/3562 385/16 |
| 5,488,682 A | * | 1/1996 | Sauter | G02B 6/32 385/24 |
| 5,768,458 A | * | 6/1998 | Ro | G02B 6/2937 385/61 |
| 5,778,124 A | * | 7/1998 | Nedstedt | G02B 6/32 359/819 |
| 5,841,917 A | * | 11/1998 | Jungerman | G02B 6/3514 385/17 |
| 5,940,564 A | * | 8/1999 | Jewell | G02B 6/4204 385/35 |
| 6,094,293 A | * | 7/2000 | Yokoyama | G02B 6/3572 359/280 |
| 6,259,835 B1 | * | 7/2001 | Jing | G02B 6/3514 385/16 |
| 6,449,406 B1 | * | 9/2002 | Fan | G02B 6/3514 385/17 |
| 6,453,083 B1 | * | 9/2002 | Husain | G02B 6/3514 385/17 |
| 6,567,583 B2 | * | 5/2003 | Mettler | G02B 6/14 385/28 |
| 6,577,783 B2 | * | 6/2003 | Dautartas | G02B 6/32 385/15 |
| 6,584,250 B2 | * | 6/2003 | Lin | G02B 6/26 385/52 |
| 6,632,025 B2 | * | 10/2003 | Ukrainczyk | G02B 6/262 385/70 |
| 6,655,850 B2 | * | 12/2003 | Mann | G02B 6/32 385/33 |
| 6,751,369 B1 | * | 6/2004 | Lewis | G02B 6/3582 385/18 |
| 6,792,173 B2 | * | 9/2004 | Bona | B81B 7/04 385/15 |
| 6,842,552 B1 | * | 1/2005 | Steinberg | G02B 6/3506 385/15 |
| 6,915,049 B2 | * | 7/2005 | Murata | G02B 6/4202 385/52 |
| 6,934,444 B2 | * | 8/2005 | Ghiron | G02B 6/34 385/36 |
| 6,963,678 B2 | * | 11/2005 | Werkheiser | G02B 6/3803 359/366 |
| 7,118,294 B2 | * | 10/2006 | Hamasaki | G02B 6/423 385/89 |
| 7,183,633 B2 | * | 2/2007 | Daneman | G02B 6/3518 257/678 |
| 7,228,033 B2 | * | 6/2007 | Bhagavatula | G02B 6/2552 385/33 |
| 7,421,159 B2 | * | 9/2008 | Yang | G02B 6/32 385/137 |
| 7,474,822 B2 | * | 1/2009 | Kobayashi | G02B 6/325 385/35 |
| 7,476,041 B2 | * | 1/2009 | Kopp | G02B 6/4203 385/139 |
| 7,775,725 B2 | * | 8/2010 | Grinderslev | G02B 6/3874 385/55 |
| 8,038,354 B2 | * | 10/2011 | Nielson | G02B 6/3878 385/59 |
| 8,049,890 B2 | * | 11/2011 | Neus | G02B 6/2817 356/399 |
| 8,556,521 B2 | * | 10/2013 | Everett | G02B 6/3807 385/62 |
| 8,714,834 B2 | * | 5/2014 | Cowen | G02B 6/3878 385/56 |
| 8,905,648 B2 | * | 12/2014 | Zhang | G02B 6/262 385/15 |
| 9,039,291 B2 | * | 5/2015 | Doit | G02B 6/32 385/74 |
| 9,052,470 B2 | * | 6/2015 | Everett | G02B 6/3807 |
| 9,588,302 B2 | * | 3/2017 | Grinderslev | G02B 6/32 |
| 9,638,860 B2 | * | 5/2017 | Moriya | G02B 6/3853 |
| 9,658,404 B2 | * | 5/2017 | Ohnstein | G02B 6/3652 |
| 9,696,502 B2 | * | 7/2017 | Farnan | G02B 6/3853 |
| 9,791,632 B2 | * | 10/2017 | Jacobsson | G02B 6/32 |
| 10,036,857 B2 | * | 7/2018 | Grinderslev | G02B 6/3846 |
| 10,082,629 B2 | * | 9/2018 | Mitsui | G02B 6/32 |
| 2001/0026660 A1 | * | 10/2001 | Asakura | G02B 6/12007 385/47 |
| 2002/0009261 A1 | * | 1/2002 | Bhagavatula | G02B 6/2552 385/35 |
| 2002/0114578 A1 | * | 8/2002 | Lin | G02B 6/26 385/52 |
| 2002/0168135 A1 | * | 11/2002 | Dautartas | G02B 6/32 385/17 |
| 2003/0012513 A1 | * | 1/2003 | Ukrainczyk | G02B 6/262 385/61 |
| 2004/0190851 A1 | * | 9/2004 | Garner | G02B 6/3672 385/137 |
| 2004/0202418 A1 | * | 10/2004 | Ghiron | G02B 6/34 385/36 |
| 2006/0257077 A1 | * | 11/2006 | Oosterhuis | G02B 6/3604 385/74 |
| 2007/0217741 A1 | * | 9/2007 | Shigenaga | G02B 6/32 385/33 |
| 2007/0286549 A1 | * | 12/2007 | Warashina | G02B 6/4246 385/33 |
| 2009/0110347 A1 | * | 4/2009 | Jacobsson | G02B 6/32 385/16 |
| 2013/0148933 A1 | * | 6/2013 | Eberle | A61B 1/00165 385/116 |
| 2013/0301982 A1 | * | 11/2013 | Lee | G02B 6/4206 385/14 |
| 2014/0029890 A1 | * | 1/2014 | Sun | G02B 6/422 385/14 |
| 2017/0299816 A1 | * | 10/2017 | Mitsui | G02B 6/32 |
| 2018/0120510 A1 | * | 5/2018 | Sullivan | G02B 6/32 |
| 2018/0294891 A1 | * | 10/2018 | Gudeman | H04B 10/801 |

* cited by examiner

SELF-ALIGNED SILICON FIBER OPTIC CONNECTOR

CROSS REFERENCE TO RELATED APPLICATIONS

This US nonprovisional patent application claims priority to U.S. Provisional Application Ser. No. 62/484,366, filed Apr. 11, 2017. This application is incorporated by reference in its entirety.

STATEMENT REGARDING FEDERALLY SPONSORED RESEARCH

Not applicable.

STATEMENT REGARDING MICROFICHE APPENDIX

Not applicable.

BACKGROUND

This invention relates to fiber optic cabling for optical data multiplexing, and methods to align the fiber optic carriers to the laser sources.

Data centers use thousands of optical fibers to interconnect the servers to one another. Ideally the technicians who maintain this web of interconnections could unplug one patch cable and plug in a new patch cable or a patch cable that provides a different multiplexing path much in the same way that a video cable is plugged into a television. Because the patch cable is optical and not electrical, the alignment of the myriad fibers is critical to data integrity. Also, dirt and particles can attenuate the optical path and affect data integrity. Ideally a technician could reach around to the back of the rack, disconnect the old patch cable and connect the new without being able to see the connectors.

Currently, connectors for fiber optic cabling can adequately (<1 dB insertion loss) provide passive alignment for up to 16 fibers. Beyond that, the probability that one of the fibers is misaligned or that there is a blocking particle in the beam path becomes prohibitively high. Also, these connectors use a method called butt-coupling of output fiber to input fiber, which requires that the polished ends of the two fibers be pressed together with high force to minimize the air gap, and thus the reflection at the connection. This further limits the number of fibers that can be bundled into a single connector.

Accordingly, a device is needed that can connect a plurality of optical data sources such as VCSEL lasers to a plurality of output fiber optic cables with low insertion loss and high efficiency.

SUMMARY

Silicon provides an ideal substrate for most MEMS applications as a result of the vast selection of processes and tooling available for modifying a Si wafer. This extreme precision to which lines and pockets and protrusions can be formed is advantageous for optical applications, because very tight alignment precision is required for optimal performance of an optical system. Unfortunately Si is opaque for much of the electromagnetic spectrum. Only at wavelengths longer than ~1.3 um does Si become transparent. For the class of semiconductor laser referred to as a VCSEL (Vertical Cavity Surface Emitting Laser), which lases at 850 nm, Si and the precision machining that it enables is not usable. This issue prevents the combination of low cost of VCSEL manufacturing with low cost Si wafer processing. Because VCSELs are widely used in optical communication networks, higher cost and lower performance solutions are required today.

We describe here a method that employs
1) through holes in the Si to allow passage of the 850 nm radiation
2) KOH etched pockets to self-align ball lenses
3) Through holes in the Si to self-align fibers and fiber bundles These methods can be made extremely low cost due to the highly parallel nature of Si wafer processing.

Accordingly, a structure is disclosed here for an optical transmission system. The system may include a plurality of optical elements for encoding or decoding information as an optical signal, a first silicon substrate with a first plurality of through holes formed therein, with each through hole corresponding to an optical source, and a ball lens disposed at an end of the through hole. The optical element may be at least one of a radiation emitter and a radiation detector. The structure may include a plurality of funnel shaped depressions disposed on one end of the through holes, wherein the ball lenses are seated in the funnel shaped depressions. The structure may further include a second silicon substrate formed with a second plurality of through holes. A plurality of fiber optic transmission lines may be disposed in the second plurality of through holes.

A method for interconnecting a plurality of optical elements to a plurality of optical transmission lines is also disclosed. The method may include emitting or receiving laser radiation by an optical element, transmitting the laser radiation through a through hole in a first silicon substrate, receiving the laser radiation in a plurality of through holes in a second silicon substrate. The method may further include collimating the laser radiation with a ball lens disposed between the first and the second silicon substrates.

These and other features and advantages are described in, or are apparent from, the following detailed description.

BRIEF DESCRIPTION OF THE DRAWINGS

Various exemplary details are described with reference to the following figures, wherein.

It should be understood that the drawings are not necessarily to scale, and that like numbers may refer to like features.

DETAILED DESCRIPTION

The following discussion presents a plurality of exemplary embodiments of the novel optical transmission system. The following reference numbers are used in the accompanying figures to refer to the following:
- 15 silicon substrate
- 25 through hole DRIE etched
- 35 anisotropic etched wedge
- 45 ball lens
- 55 laser substrate
- 65 VCSEL
- 75 anisotropic etch
- 85 through hole
- 95 silicon subtrate
- 105 fiber optic In some of the following embodiments of the systems and methods, a plurality of through holes is formed in a silicon substrate to allow the optical radiation to pass through. A ball lens may be used to collimate the diverging source, and launch the radiation into the fiber optic waveguide, or into a through hole formed in an otherwise opaque substrate.

Figure 1:
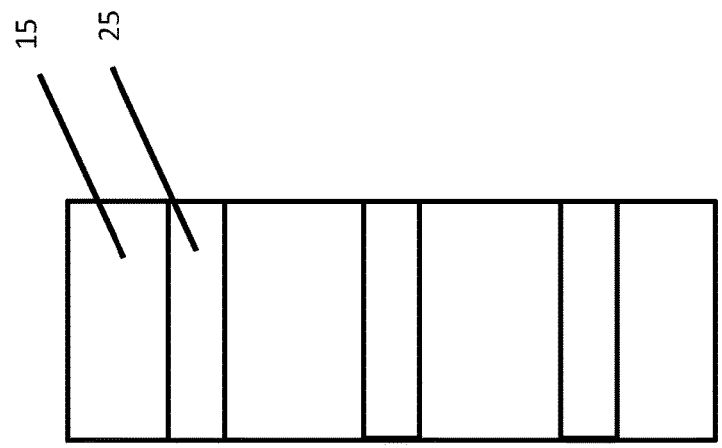
FIG. 1 is a schematic cross sectional view of a silicon self-aligned fiber optic connector with through holes formed therein.

FIG. 1 is a schematic cross sectional view of a silicon self-aligned fiber optic connector with through holes formed therein. As shown in FIG. 1, a plurality of through holes 25 may be formed in a silicon substrate 15. These through holes may be formed using, for example, deep reactive ion etching (DRIE). Deep Reactive Ion Etching is well known in the art, using a plasma of SF6 to form holes in silicon, by removing material, and leaving a nearly vertical sidewall. The placement or location of the holes may be formed with respect to the expected location of a plurality of expected laser sources, discussed further below.

Figure 2:
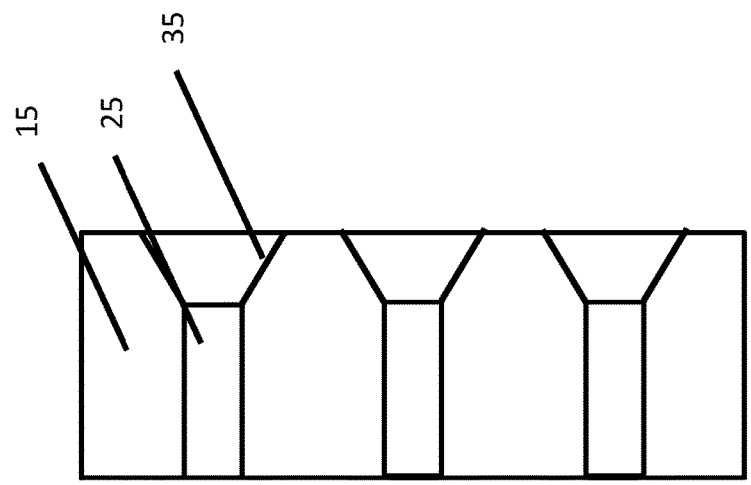
FIG. 2 is a schematic cross sectional view of a silicon self-aligned fiber optic connector with through holes and funnel depressions formed therein.

FIG. 2 is a schematic cross sectional view of a silicon self-aligned fiber optic connector with through holes and funnel depressions formed therein. In FIG. 2, and anisotropic etch is used to form a funnel shaped depression 35 in the silicon substrate 15 at the location of the through holes 25. The anisotropic etch may be performed using potassion hydroxide (KOH) for example. Anisotropic KOH etching is well known in the art. For example, a 30% KOH etchant may be prepared using 70 g KOH pellets in 190 ml deionized water. Etching a silicon wafer in this solution at 80 degrees centigrade will result in a remove about 1 micron per minute of material. This method is known to produce a depression 35 with about 55 degree angled sidewalls relative to protected surfaces. A plurality of funnel-shaped depressions 35 may thereby be formed in registration with the through holes 25, in anticipation of a set of laser sourced having this pitch. This shape may be useful for seating securely a spherical ball lens, as shown in FIG. 3.

Figure 3:
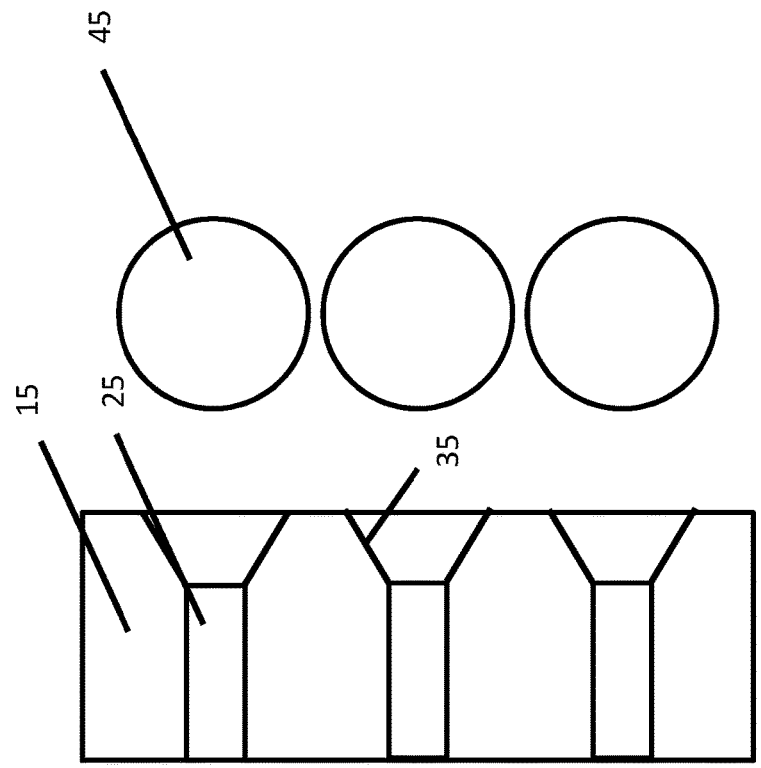
FIG. 3 is a schematic cross sectional view of a silicon self-aligned fiber optic connector with through holes and funnel depressions formed therein, with ball lenses registered with the funnel depressions.

FIG. 3 is a schematic cross sectional view of a silicon self-aligned fiber optic connector with through holes and funnel depressions formed therein, with ball lenses 45 registered with the funnel depressions. The ball lenses 45 may be placed using a pick-and-place machine, for example. The funnel shaped depressions 35 may act to locate the ball lenses correctly with respect to the through holes 25 and expected laser sources to come.

Figure 4:
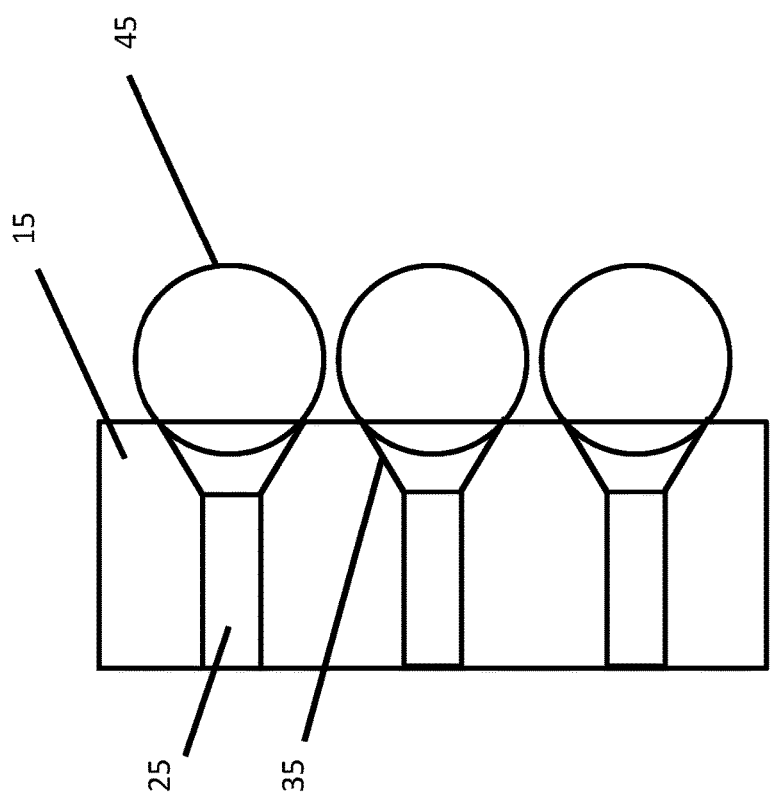
FIG. 4 is a schematic cross sectional view of a silicon self-aligned fiber optic connector with ball lenses adhered in the funnel depressions.

FIG. 4 is a schematic cross sectional view of a silicon self-aligned fiber optic connector with ball lenses adhered in the funnel depressions. In FIG. 4, the ball lenses 45 may be secured in place using an adhesive such as a glue or cement. The ball lenses 45 may serve to collimate the diverging light source to launch the radiation into the downstream fiber optic cable.

Figure 5:
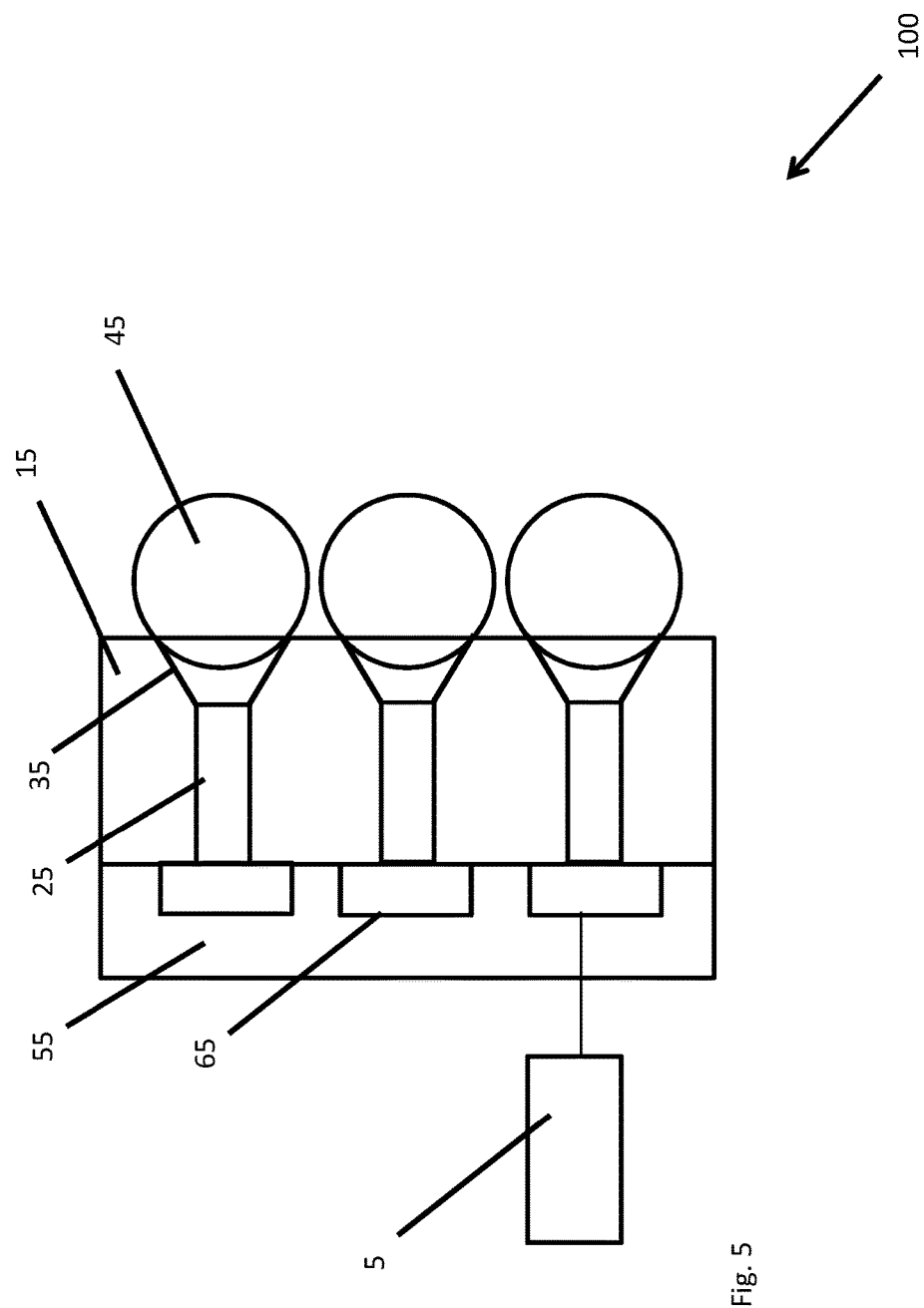
FIG. 5 is a schematic cross sectional view of a silicon self-aligned fiber optic connector with a laser array joined to the through holes.

FIG. 5 is a schematic cross sectional view of a silicon self-aligned fiber optic structure 100 using the components described previously. The structure 100 may include a laser array 65 joined to the through holes 25. The laser array 65 may come as a strip installed in or on a silicon substrate 55. The silicon substrate 55 may have the lasers 65 fabricated directly therein using lithographic processing, or glued, epoxied or bonded as individual devices into relieved areas formed to accept the devices 65. A plurality of funnel shaped depressions 35 may be formed in the silicon substrate 15. These depressions may seat a plurality of ball lenses 45, as shown in FIG. 5. The ball lenses may collimate light generated by the lasers 65, as described with respect to FIG. 4.

In another embodiment, the array 65 may be a plurality of optical detectors rather than optical sources. The detectors 65 may be, for example, photodiodes. Accordingly, the structure 100 may receive light from a remote source and transported by fiber optic cables, and direct this light to a photodiode array of detectors 65. The structure may also include an encoder or decoder 5, which encodes or decodes information to or from lasers or detectors 65.

Figure 6:
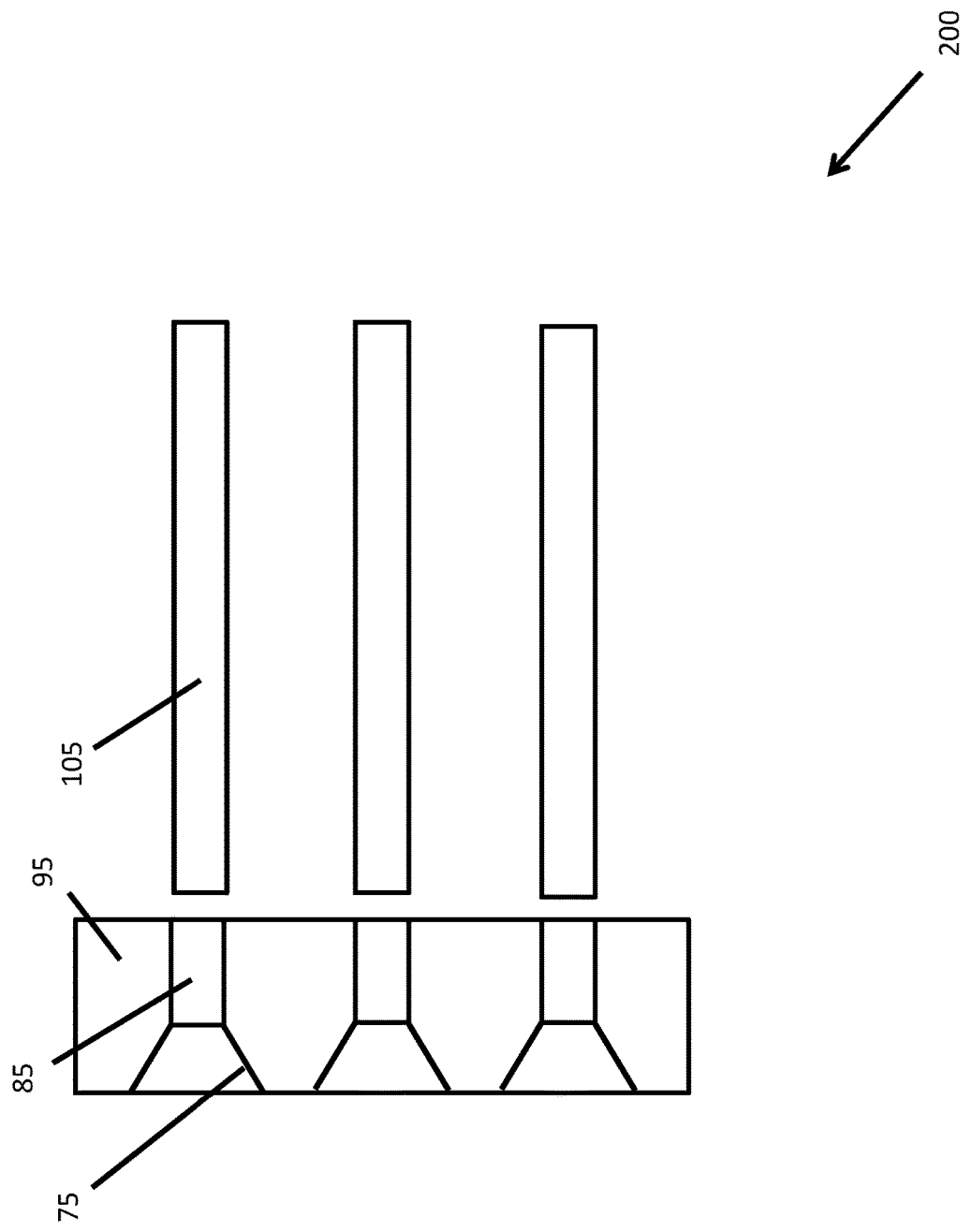
FIG. 6 is a schematic cross sectional view of a second silicon fiber optic connector with fiber optic cables registered with the through holes and funnel depressions formed therein.

FIG. 6 is a schematic cross sectional view of a second silicon fiber optic structure 200 with through holes and funnel depressions formed therein. A second silicon substrate 95 may have a plurality of through holes 85 formed therein. The through holes 85 may be formed using deep reactive ion etching (DRIE) in a manner similar to, or identical to, the process used to form through holes 25 in the first silicon substrate 15. The plurality of through holes 85 may be located to register with the laser sources 65.

The second silicon substrate 95 may also have funnel shaped depressions 75 formed therein. These depressions 75 may be formed using an anisotropic KOH etch that is similar or identical to that used to form depressions 35. These funnel shape depressions 75 may be located at the surface of the substrate 95 and at the ends of the through holes 85. The pitch between the depressions 75 may be chosen to correspond to the pitch in the first substrate 15 and plurality of laser sources 65. Fiber optic transmission lines 105 may then be inserted into and affixed within the through holes 85 of the second substrate. The situation is as shown in FIG. 6.

Figure 7:
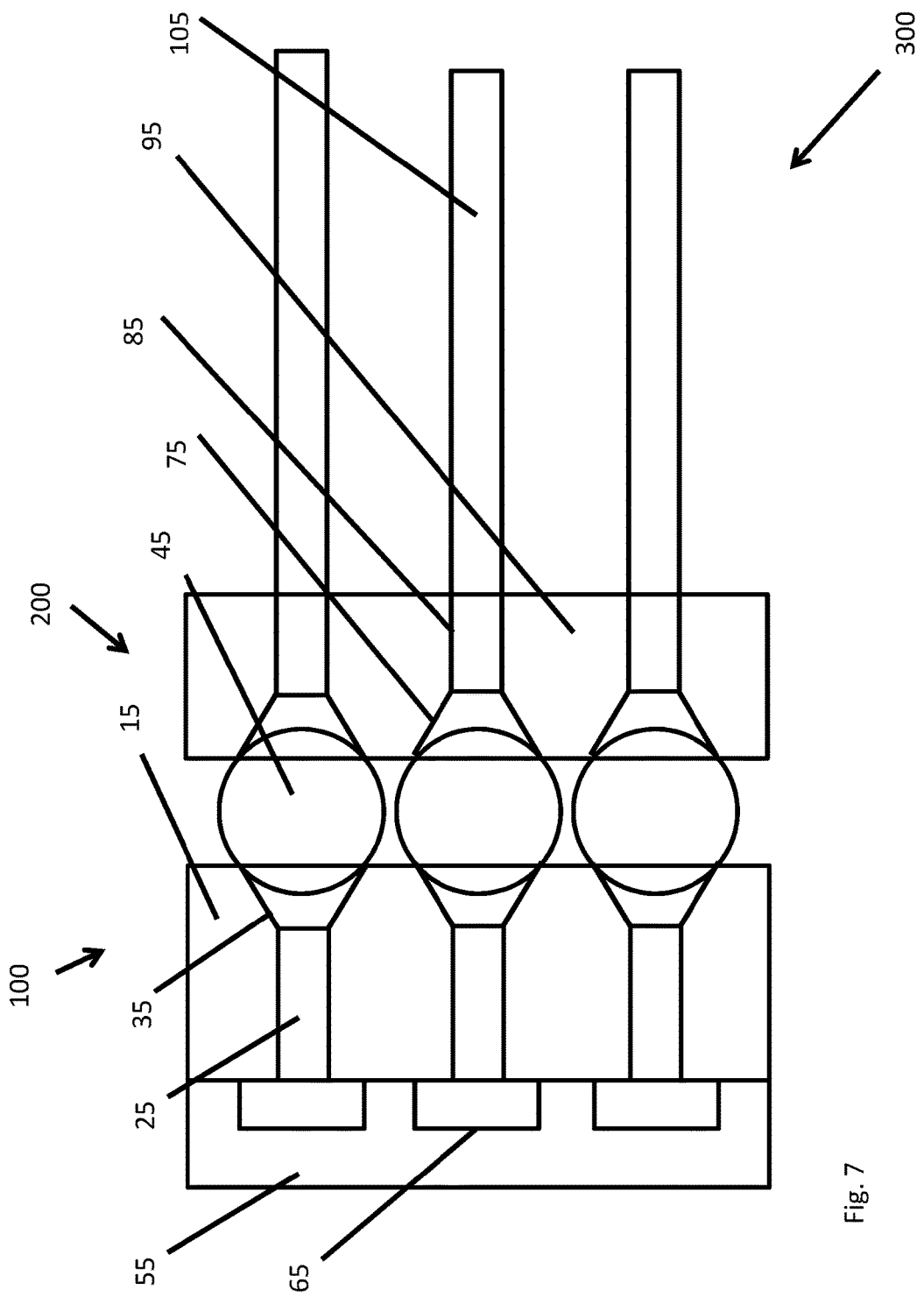
FIG. 7 is a schematic cross sectional view of a second silicon fiber optic connector with fiber optic cables registered with the through holes and funnel depressions formed therein, aligned and joined to the ball lenses of the first silicon self-aligned fiber optic connector.

FIG. 7 is a schematic cross sectional view of a self-aligned fiber optic transceiver using the components previously described. The transceiver 300 may include the second silicon fiber optic structure 200 of FIG. 6, aligned and joined to self-aligned fiber optic structure 100 of FIG. 5, to form the fiber optic transceiver 300. As described previously, optical structure 200 has the fiber optic cables registered with the through holes and funnel depressions formed therein. The silicon self-aligned fiber optic structure 100 has the array of sources or detectors 65, aligned and joined to the ball lenses as described previously. In this orientation, the first substrate 15 may be bonded to the second substrate 95 via the ball lenses 45. That is, the ball lenses may be located and bonded in the funnel shaped depressions 35 formed in the first silicon substrate 15. They may, as shown in FIG. 7, then subsequently be located and bonded to the funnel shaped depressions 75 formed in the second silicon substrate 95. This configuration of components may form the fiber optic transceiver 300.

As discussed previously, the array of elements 65 may be either emitters such as VCSELs, or detectors such as photodiodes. Accordingly, the transceiver 300 may either deliver light from optical sources 65 and launch that light down a fiber bundle 105, or it may transceive light from a remote source and transported by fiber optic cables 105, and direct this light to a photodiode array of detectors 65.

Figure 8:
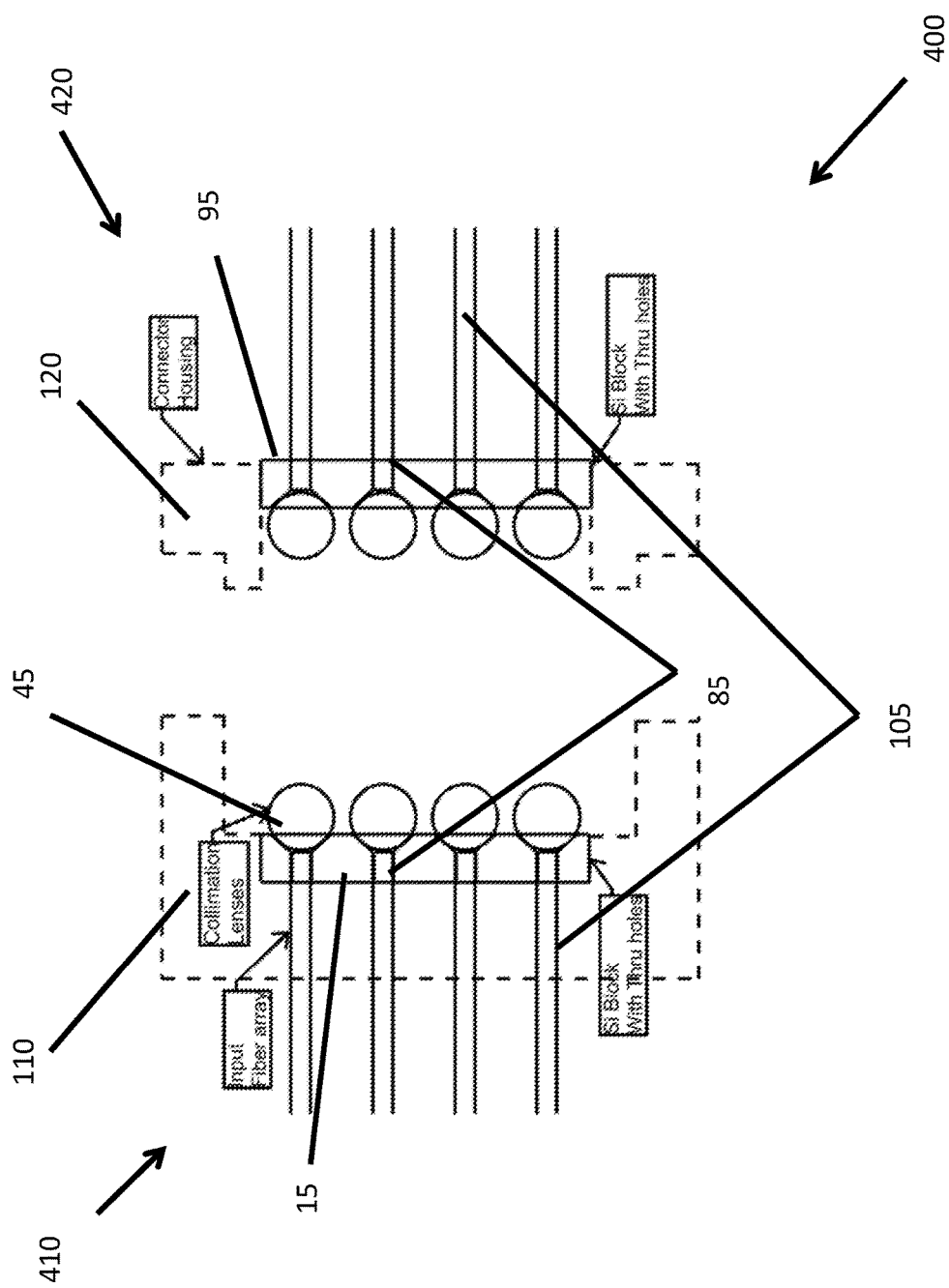
FIG. 8 is a schematic cross sectional view of an input structure with input fiber optic cables registered with the through holes and funnel depressions formed therein, and aligned with respect to a second output structure also having through holes and funnel depressions formed therein.

FIG. 8 shows schematically a plan or cross sectional view of an interconnect using the systems and method described above. In contrast to the device shown in FIG. 7, which is an emitter/detector/transceiver 300, the device is an interconnect 400, which connects an input fiber array 410 with an input coupling 110 to an output fiber array 420 having an output coupling 120. Input and output couplings 110 and 120 are mechanical devices that can be temporarily snapped together and thus connected, but can then subsequently be disconnected. Alternatively and without loss of generality, the fiber optic interconnect can have an input 420 connected to an output array 410, which can be detachably connected using couplings 120 and 110, respectively.

As before, a plurality of through holes may be formed in a silicon substrate 15. These through holes may be formed using, for example, deep reactive ion etching (DRIE). The placement or location of the holes may be formed with respect to the expected location of a plurality of expected laser sources. An anisotropic etch may be used to form funnel shaped depressions in the silicon substrate 15 at the location of the through holes. The anisotropic etch may be performed again using potassium hydroxide (KOH) for example. The plurality of funnel-shaped depressions may be formed in registration with the through holes. The funnel shaped depressions may be used to seat the ball lenses 45. The ball lenses 45 may be placed using a pick-and-place machine, for example. The funnel shaped depressions 35 may act to locate the ball lenses correctly with respect to the through holes and fiber optic cables to come.

In FIG. 8, the input array 410 may have ball lenses 45 be secured in place using an adhesive such as a glue or cement. The ball lenses 45 may serve to collimate the diverging light which may be emitted from the fiber optic cables 85. The input fiber optic cables may be installed in the through holes of the first silicon substrate 15 to form the input structure 110.

A second, output structure 420 may be formed using a similar method. In output structure 420, a second silicon substrate 95 may have a plurality of through holes formed therein. The through holes may be formed using deep reactive ion etching (DRIE) in a manner similar to, or identical to, the process used to form through holes in the first silicon substrate 15. The plurality of through holes may be located to register the input fiber optic cables 85.

The second silicon substrate 95 may also have funnel shaped depressions formed therein. These funnel shape depressions may be located at the surface of the substrate 95 and at the ends of the through holes. The pitch between the depressions may be chosen to correspond to the pitch in the first substrate 15 and plurality of holes and fiber optic cables 85 and 105. Fiber optic transmission lines 105 may then be inserted into and affixed within the through holes 85 of the second substrate. The situation is as shown in FIG. 8.

The input array 410 and output array 420 may also comprise a coupling structure 110 and 120 that allows the input array 410 to be detachably connected to the output array 420. This coupling structure 110, 120 may be a ferrule, as is known in the art.

Figure 9:
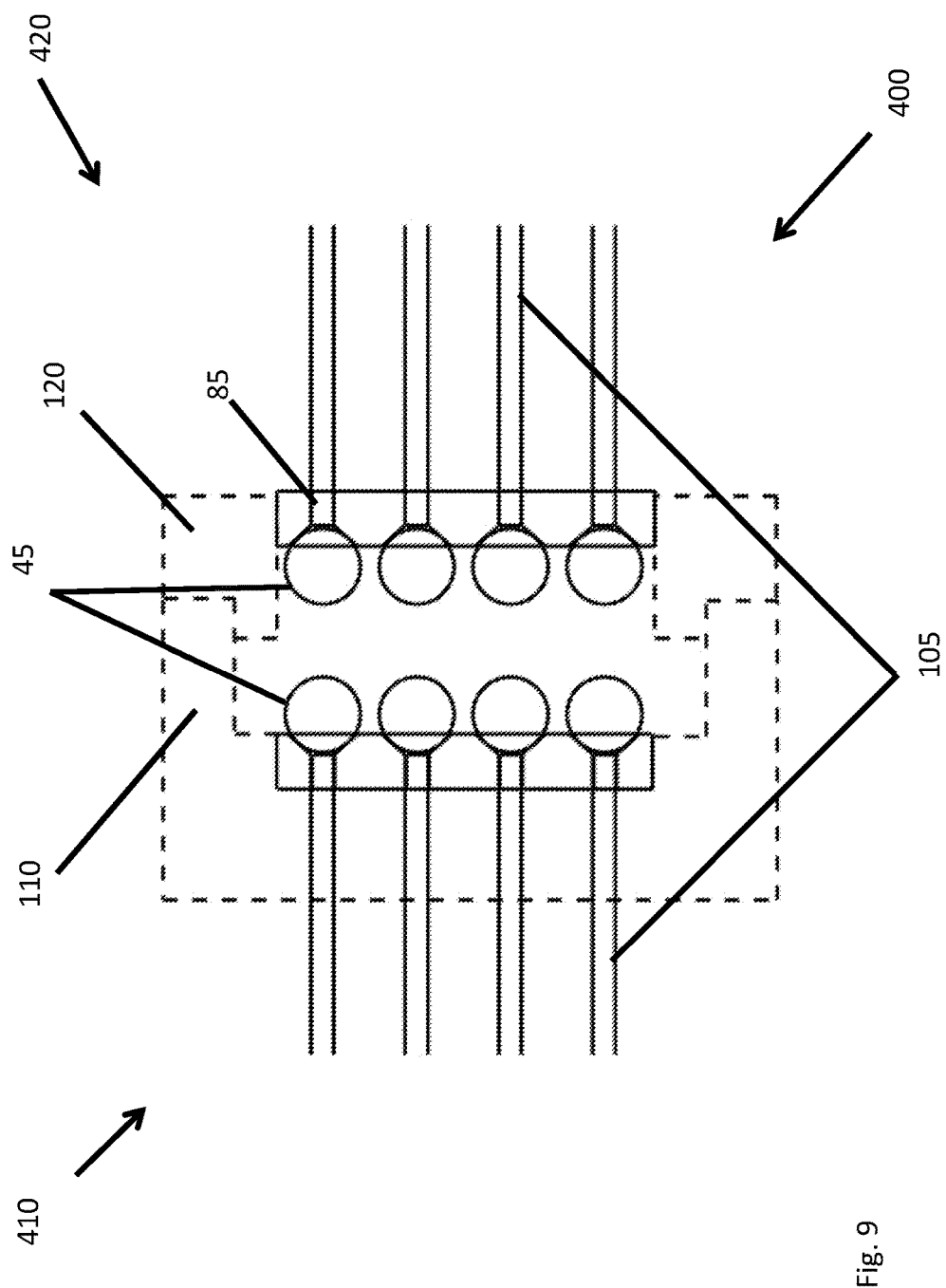
FIG. 9 is a schematic cross sectional view of the input structure aligned and joined to the output structure with a detachable interconnect.

FIG. 9 is a schematic cross sectional view of the assembled interconnect 400. The interconnect 400 may include the second silicon output fiber optic connector array 420 with fiber optic cables registered with the through holes and funnel depressions formed therein, aligned and joined to the first input silicon fiber optic array 410 with fiber optic cables. The connection is made by the coupling structure 110, 120 and this structure may align the two sets of ball lenses, such that radiation emitted from the input fiber optic array is efficiently coupled into the output fiber optic array. The ball lenses on the input array 410 may collimate the diverging light emitted from the input fibers, and the second ball lens 45 may focus the light and launch it into the output fibers.

Since the coupling structure is detachable, segments of fiber optic cable can be easily detached if non-functional or excessively lossy, and replaced with a new fiber optic array.

Disclosed here is a structure for an optical transmission system, including a plurality of optical elements for encoding or decoding information as an optical signal which emits or detects radiation along an axis, a first silicon substrate with a first plurality of through holes formed therein, with each through hole parallel to the axis of one of the plurality of optical elements, and a plurality of ball lenses disposed at an end of the plurality of through holes, which collimates or focuses the radiation along the axis. The optical element may be at least one of a radiation emitter and a radiation detector. The structure may include a plurality of funnel shaped depressions disposed on one end of the through holes, wherein the ball lenses are seated in the funnel shaped depressions. The structure may further include a second silicon substrate formed with a second plurality of through holes. A plurality of fiber optic transmission lines may be disposed in the second plurality of through holes.

The structure may further include an adhesive which bonds the ball lenses to both the first substrate and the second substrate, and an encoder that encodes the optical radiation with information. Both the first and the second substrates may be silicon substrates. The optical element may be a vertical cavity surface emitting laser (VCSEL) or a photodiode.

The ball lens may be a substantially spherical optical element, substantially transparent to radiation from the optical source, that collimates rays emanating from the optical source or focuses collimated rays. The ball lens may be spheres comprising at least one of glass, quartz, sapphire, borosilicate and zirconium.

A method for interconnecting a plurality of optical elements to a plurality of optical transmission lines is also disclosed. The method may include emitting or receiving laser radiation by an optical element, transmitting the laser radiation through a through hole in a first silicon substrate, receiving the laser radiation in a plurality of through holes in a second silicon substrate. The method may further include collimating the laser radiation with a ball lens disposed between the first and the second silicon substrates.

Within the method, the plurality of holes in the second silicon substrate may have a plurality of fiber optic output cables disposed therein. The method may further comprise coupling the radiation from the optical sources into the plurality of fiber optic output cables using the ball lenses. The method may further comprise coupling the first silicon substrate to the second silicon substrate with a coupling structure, and decoupling the first silicon substrate from the second silicon substrate.

The method may further comprise encoding the radiation produced by the plurality of optical sources with a waveform corresponding to transmitted information. The method may further include forming at least one of the first plurality of holes and the second plurality of holes using deep reactive ion etching.

The plurality of optical sources may be vertical cavity surface emitting lasers (VCSELs). The ball lenses may be spheres comprising at least one of glass, quartz, sapphire, borosilicate and zirconium. The optical elements may be at least one of a VCSEL and a photodiode.

In another embodiment, an interconnect for an optical transmission system is disclosed. The interconnect may include a plurality of optical elements, a first silicon substrate with a first plurality of through holes formed therein, with each through hole corresponding to an optical element, and a ball lens disposed at an end of the through hole, a second silicon substrate with a second plurality of through holes formed therein, with each of the second plurality of through holes corresponding to an optical element, and a ball lens disposed at an end of each of the second of the plurality of through holes.

In this interconnect, the first silicon substrate and the second silicon substrate may be detached and re-attached to one another. The first silicon substrate may be configured to be coupled to the second silicon substrate by a coupling structure, and can be decoupled from the second silicon substrate with the coupling structure. The coupling structure may be a ferrule.

A structure for an optical transmission system is also disclosed. The structure may include a first silicon substrate with a first plurality of through holes formed therein, with each through hole parallel to the axis of one of the plurality of optical elements, a first plurality of funnel-shaped depressions at the ends of the first plurality of through holes, a second silicon substrate with a second plurality of through holes formed therein, with each through hole parallel to the axis of one of the plurality of optical elements, a second plurality of funnel-shaped depressions at the ends of the first plurality of through holes, and a plurality of ball lenses disposed at the ends of the plurality of through holes, and seated between the first and the second pluralities of funnel-shaped depressions, wherein the structure couples radiation in the first plurality of through holes to the second plurality of through holes.

The structure may further comprise a plurality of fiber optic cables disposed in at least one of the first and the second pluralities of through holes in the first or the second silicon substrates. The first silicon substrate and the second silicon substrate may be detachable from one another, that is, they can detached and re-attached to one another. The first silicon substrate may be configured to be coupled to the second silicon substrate by a coupling structure, and can be decoupled from the second silicon substrate with the coupling structure. The coupling structure may be a ferrule.

While various details have been described in conjunction with the exemplary implementations outlined above, various alternatives, modifications, variations, improvements, and/ or substantial equivalents, whether known or that are or may be presently unforeseen, may become apparent upon reviewing the foregoing disclosure. Accordingly, the exemplary implementations set forth above, are intended to be illustrative, not limiting.

What is claimed is:

1. A structure for an optical transmission system, comprising:
    a plurality of optical elements for encoding or decoding information as an optical signal, wherein the optical element emits or detects radiation along an axis;
    a first silicon substrate with a first plurality of through holes formed therein, wherein the through holes are circular, and cylindrically symmetrical, such that the optical elements are self-aligned and when inserted and affixed within the through holes with each through hole parallel to the axis of one of the plurality of optical elements; and
    a plurality of ball lenses disposed at the ends of the plurality of through holes, which collimates or focuses the radiation along the axis.

2. The structure of claim 1, wherein the optical element is at least one of a radiation emitter and a radiation detector.

3. The structure of claim 1, further comprising:
    a plurality of funnel shaped depressions disposed on one end of the through holes, wherein the ball lenses are seated in the funnel shaped depressions.

4. The structure of claim 1, further comprising:
    a second silicon substrate formed with a second plurality of through holes.

5. The structure of claim 4, further comprising: a plurality of fiber optic transmission lines disposed in the second plurality of through holes.

6. The structure of claim 3, further comprising an adhesive which bonds the plurality of ball lenses to the plurality of funnel shaped depressions.

7. The structure of claim 1, further comprising an encoder that encodes the optical radiation with information.

8. The structure of claim 1, wherein both the first and the second substrates are silicon substrates.

9. The structure of claim 1, wherein the optical element is a vertical cavity surface emitting laser (VCSEL).

10. The structure of claim 1, wherein the optical element is a photodiode.

11. The structure of claim 1, wherein the ball lens is a substantially spherical optical element, substantially transparent to radiation from the optical source, that collimates rays emanating from the optical source or focuses collimated rays.

12. The structure of claim 1, wherein the ball lens are spheres comprising at least one of glass, quartz, sapphire, borosilicate and zirconium.

13. A method for interconnecting a plurality of optical elements to a plurality of optical transmission lines, comprising:
    emitting or receiving laser radiation from a plurality of optical elements;
    transmitting the laser radiation through a plurality of through holes in a first silicon substrate, wherein the through holes are circular, and cylindrically symmetrical, such that the optical elements are self-aligned when inserted and affixed within the through holes;
    receiving the laser radiation in a plurality of through holes in a second silicon substrate.

14. The method of claim 13, further comprising collimating the laser radiation with a ball lens disposed between the first and the second silicon substrates.

15. The method of claim 13, wherein the plurality of holes in the second silicon substrate has a plurality of fiber optic output cables disposed therein.

16. The method of claim 13, further comprising coupling the radiation from the optical elements into the plurality of fiber optic output cables using the ball lenses.

17. The method of claim 13, further comprising:
coupling the first silicon substrate to the second silicon substrate with a coupling structure; and
decoupling the first silicon substrate from the second silicon substrate.

18. The method of claim 13, further comprising:
encoding the radiation produced by the plurality of optical elements with a waveform corresponding to encoded information.

19. The method of claim 13, wherein the plurality of optical elements are vertical cavity surface emitting lasers (VCSELs).

20. The method of claim 13, wherein the ball lenses are spheres comprising at least one of glass, quartz, sapphire, borosilicate and zirconium.

21. The method of claim 13, further comprising forming at least one of the first plurality of holes and the second plurality of holes using deep reactive ion etching.

22. The method of claim 13, wherein the optical elements are at least one of a VCSEL and a photodiode.

23. An interconnect for an optical transmission system, comprising:
a plurality of optical elements;
a first silicon substrate with a first plurality of through holes formed therein, wherein the through holes are circular, and cylindrically symmetrical, such that the optical elements are self-aligned when inserted and affixed within the through holes, with each through hole being registered with each of the plurality of optical elements; and
a plurality of ball lenses disposed at an end of each of the through holes;
a second silicon substrate with a second plurality of through holes formed therein, with each of the second plurality of through holes corresponding to an optical element; and
a fiber optic disposed at an end of each of the second of the plurality of through holes.

24. The interconnect of claim 23, wherein the first silicon substrate and the second silicon substrate can be detached and re-attached to one another.

25. The interconnect of claim 23, wherein the first silicon substrate is configured to be coupled to the second silicon substrate by a coupling structure, and can be decoupled from the second silicon substrate with the coupling structure.

26. The interconnect of claim 25, wherein the coupling structure is a ferrule.

27. A structure for an optical transmission system, comprising:
a first silicon substrate with a first plurality of through holes formed therein, wherein the through holes are circular, and cylindrically symmetrical, such that the optical elements are self-aligned when inserted and affixed within the through holes, with each through hole parallel to the axis of one of the plurality of optical elements;
a first plurality of funnel-shaped depressions at the ends of the first plurality of through holes;
a second silicon substrate with a second plurality of through holes formed therein, with each through hole parallel to the axis of one of the plurality of optical elements;
a second plurality of funnel-shaped depressions at the ends of the first plurality of through holes; and
a plurality of ball lenses disposed at the ends of the plurality of through holes, and seated between the first and the second pluralities of funnel-shaped depressions, wherein the structure couples radiation in the first plurality of through holes to the second plurality of through holes.

28. The structure for an optical transmission system of claim 27, further comprising:
a plurality of fiber optic cables disposed in at least one of the first and the second pluralities of through holes in the first or the second silicon substrates.

29. The structure of claim 27, wherein the first silicon substrate and the second silicon substrate can be detached and re-attached to one another.

30. The structure of claim 27, wherein the first silicon substrate is configured to be coupled to the second silicon substrate by a coupling structure, and can be decoupled from the second silicon substrate with the coupling structure.

31. The structure of claim 27, wherein the coupling structure is a ferrule.

* * * * *